United States Patent [19]

Ham

[11] Patent Number: 5,404,809
[45] Date of Patent: Apr. 11, 1995

[54] NUT SHELLING APPARATUS

[76] Inventor: William R. Ham, R.D. 1, Box 269, Lovelady, Tex. 75851

[21] Appl. No.: 199,657

[22] Filed: Feb. 22, 1994

[51] Int. Cl.⁶ ............................................. A23N 5/00
[52] U.S. Cl. ........................................ 99/575; 99/583; 99/579; 30/120.2; 241/169.1; 241/261.2
[58] Field of Search ................. 99/568, 574, 575, 580, 99/581, 583, 623–625, 628, 579; 30/120.2; 241/169.1, 261, 261.1–261.3

[56] References Cited

U.S. PATENT DOCUMENTS

| 198 | 1/1798 | Bruff | 99/575 |
|---|---|---|---|
| 2,823 | 10/1842 | Stoner | 99/625 |
| 22,588 | 1/1859 | Stanford | 241/261.3 |
| 131,768 | 10/1872 | McNash | 241/261.2 |
| 259,518 | 6/1882 | Fleming | 241/261.2 |
| 463,823 | 11/1891 | Beach | 99/575 |
| 578,560 | 3/1897 | Griswold | 241/261.1 |
| 688,362 | 12/1901 | Tarr | 241/261.3 |
| 1,178,075 | 4/1916 | Huston | 99/575 |
| 1,184,072 | 5/1916 | Carson | 241/261 |
| 1,257,306 | 2/1918 | Blatt | 99/579 |
| 1,258,125 | 3/1918 | Lambeth | 99/574 |
| 1,591,251 | 7/1926 | Vaughan | 99/575 |
| 3,662,799 | 5/1972 | Shaw | 99/574 |
| 4,218,968 | 8/1980 | Livingston | 99/583 |

FOREIGN PATENT DOCUMENTS 6583 of 1913 United Kingdom ................. 99/575

Primary Examiner—Mark Spisich
Attorney, Agent, or Firm—Harrison & Egbert

[57] ABSTRACT

A nut shelling apparatus including a back plate having a first roughened surface on one side, a rocker plate rotatably connected to the back plate and having a second roughened surface on a side adjacent the first roughened surface of the back plate, and a nut inlet connected to the back plate so as to open to a nut-receiving space defined between the roughened surfaces of the back plate and the rocker plate. The roughened surfaces are diamond plate surfaces. A skirt is affixed to the back plate and extends outwardly therefrom so as to be adjacent an outer edge of the rocker plate. The rocker plate is a concave member. The concave member includes a shaft which is rotatably connected to the back plate.

4 Claims, 5 Drawing Sheets

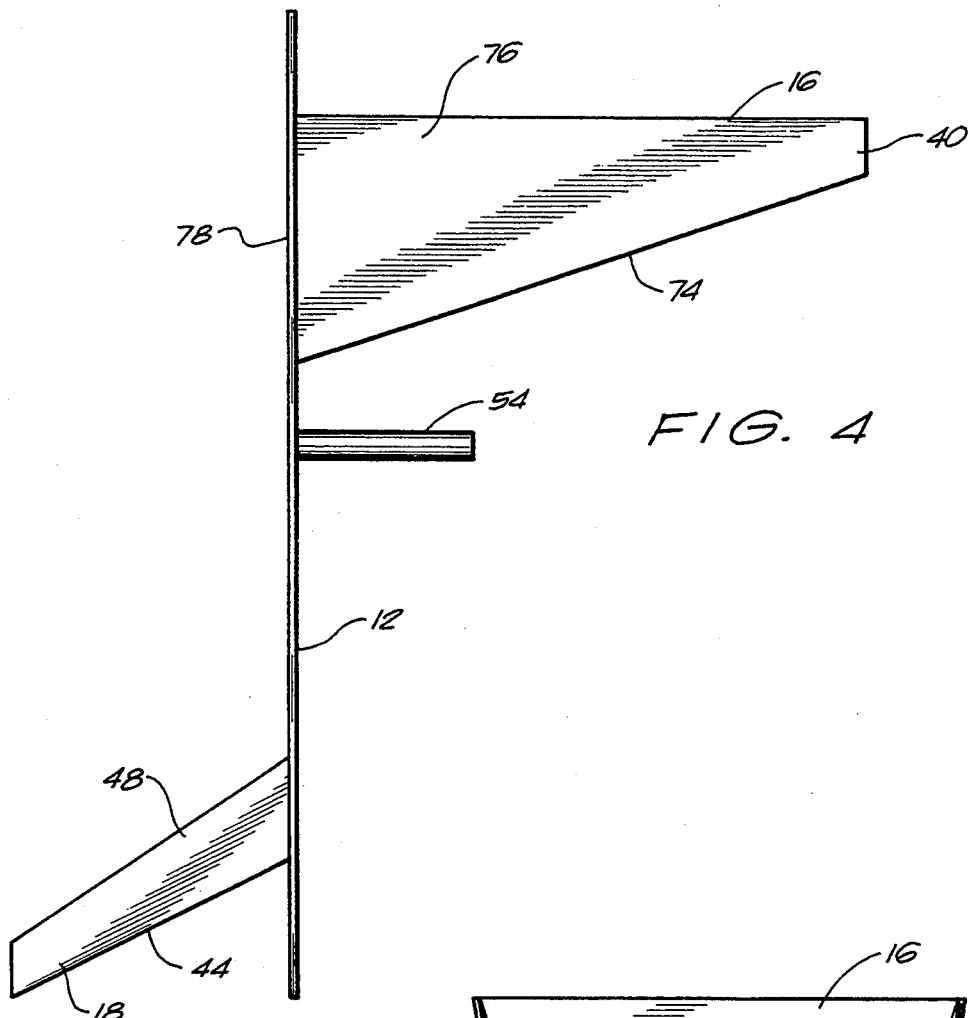
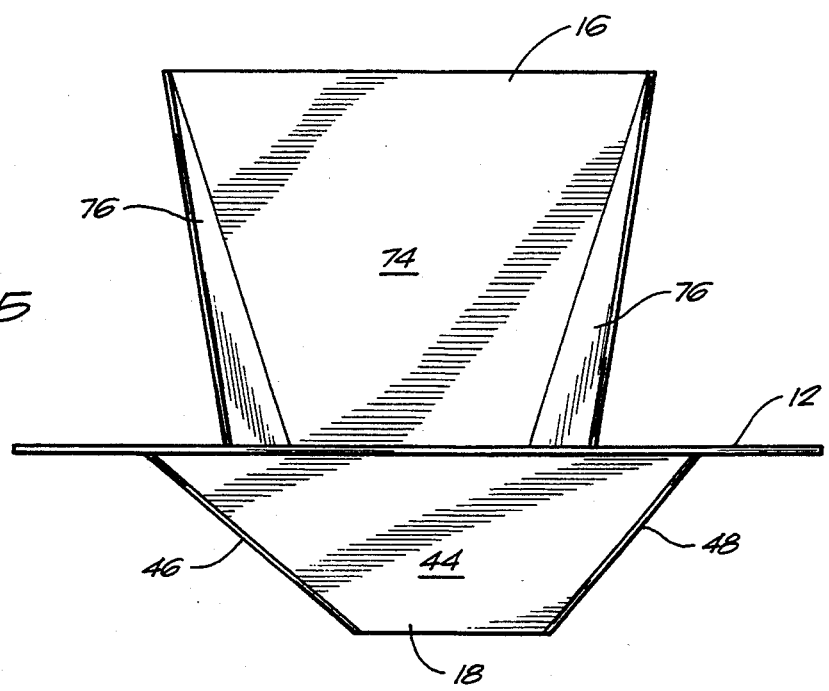

NUT SHELLING APPARATUS

TECHNICAL FIELD

The present invention relates to devices for the shelling of nuts. More particularly, the present invention relates to apparatus that facilitate the removal of the shells of multiple nuts during a single shelling operation.

BACKGROUND ART

The shelling of nuts is often a very difficult and time consuming procedure. Normally, the shell of nuts must be removed so as to expose the meat of the nut. A shell is removed by breaking the shell at an appropriate location so that the meat of the nut is properly exposed. However, for those of limited physical ability the procedure of shelling the nuts can be quite difficult. Additionally, many persons desire to shell a large number of nuts as quickly as possible. Present shelling devices fail to achieve this purpose in an efficient and effective manner.

The conventional way of shelling nuts is to position the nut between arms of a scissors-type apparatus. By squeezing the arms, the shell of the nut is compressed so as to cause a fracture across the shell of the nut. Once the shell is fractured, the shell can be opened so as to expose the meat on the interior of the shell. Often, this type of "squeezing" action will crush the meat of the nut or, otherwise, result in an ineffective shelling of the nut. Additionally, this device in the prior art is only effective for the shelling of one nut at a time. Hammers, and other types of crushing devices, have been employed, in the past, so as to break the shell of the nut.

It is an object of the present invention to provide a nut shelling apparatus that effectively exposes the meat of the nut.

It is another object of the present invention to provide a nut shelling apparatus that is effective for the shelling of multiple nuts in a single procedure.

It is a further object of the present invention to provide a nut shelling apparatus that does not damage the meat on the interior of the nut.

It is still an additional advantage of the present invention to provide a nut shelling apparatus that is easy to use, relatively inexpensive, and easy to manufacture.

These and other objects and advantages of the present invention will become apparent from a reading of the attached specification and appended claims.

SUMMARY OF THE INVENTION

The present invention is a nut shelling apparatus that comprises a back plate having a first roughened surface on one side, a rocker plate rotatably connected to the back plate and having a second roughened surface on a side adjacent the first roughened surface of the back plate, and a nut inlet connected to the back plate so as to open to the nut-receiving space formed between the back plate and the rocker plate.

The rocker plate is a concave member having a center at an outer edge. The center of the concave member is connected to the back plate. The outer edge of the concave member is positioned closer to the back plate than is the center of the concave member. The outer edge of the concave member has a generally circular configuration. A skirt is affixed to the back plate so as to extend outwardly therefrom. This skirt conforms to the circular configuration of the outer edge of the concave member. The outer edge is positioned inwardly of the skirt. A shaft is connected to the center of the concave member. The shaft is rotatably connected to the back plate. Specifically, the shaft extends through a hole formed in the back plate so as to be received by a bushing affixed to a side of the back plate opposite the first roughened surface. The shaft has a threaded end opposite the concave member. This threaded end extends outwardly of the bushing. A nut is affixed to this threaded end and is rotatable so as to vary a distance of the concave member from the back plate.

The skirt of the present invention includes a first skirt portion which is affixed to the back plate and extends adjacent to a portion of the outer edge of the concave member. A second skirt portion is affixed to the back plate and extends adjacent another portion of the outer edge of the concave member. The first and second skirt portions define a first opening adjacent a top of the concave member. These skirt portions also define a second opening positioned adjacent to a bottom of the concave member. A handle is connected to the concave member and extends outwardly from the concave member through the first opening between the skirt portions. A nut outlet chute is affixed to the back plate and extends outwardly generally adjacent to the second opening between the skirt portions.

The back plate is a vertical member. The roughened surfaces of the rocker plate and the back plate are of a diamond plate material. Suitable clamps can be provided on the back plate so as to allow the back plate to be fastened to an exterior surface. The nut inlet includes an orifice which is formed in the back plate so as to communicate with the nut-receiving space. The nut inlet also includes a feed tray which is affixed to the back plate on a side opposite the first roughened surface. The feed tray has an end opening to the orifice. The feed tray has a surface which is angled downwardly toward the orifice.

BRIEF DESCRIPTION OF THE DRAWINGS

FIG. 4 is an isolated side elevational view of the back plate of the nut shelling apparatus of the present invention.

FIG. 5 is a plan view of the back plate of the nut shelling apparatus of the present invention.

DETAILED DESCRIPTION OF THE INVENTION

Figure 1:
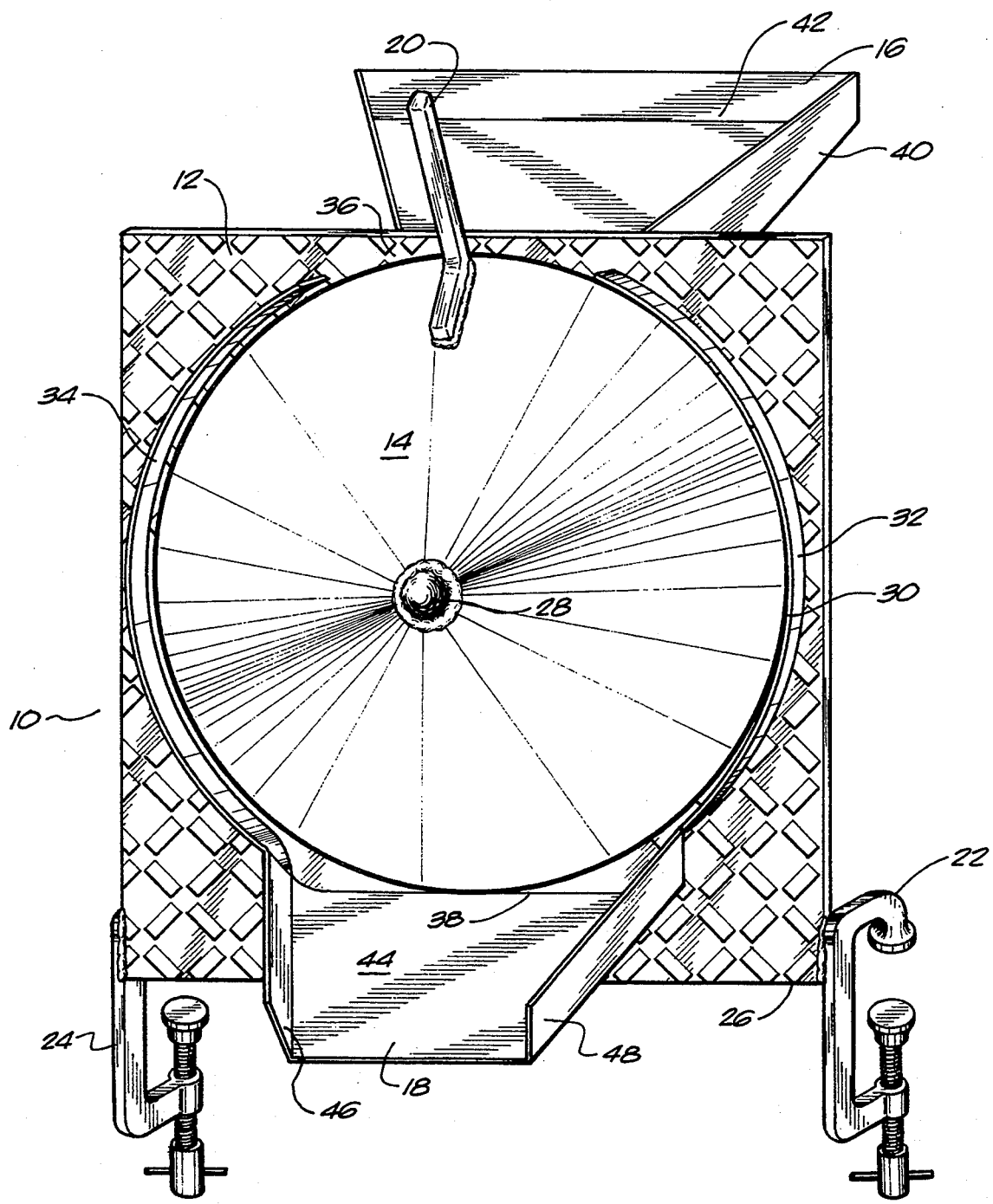
FIG. 1 is a perspective view of the nut shelling apparatus in accordance with the present invention.

Referring to FIG. 1, there is shown at 10 the nut shelling apparatus in accordance with the preferred embodiment of the present invention. The nut shelling apparatus 10 includes a back plate 12, a rocker plate 14, a nut inlet 16, and a nut outlet 18. As can be seen, the rocker plate 14 is rotatably connected to the back plate 12. A handle 20 is affixed to the rocker plate 14 and extends upwardly.

The back plate 12 of the nut shelling apparatus 10 is a rigid vertical member. As can be seen, the back plate 12 is of a diamond plate material. Diamond plate material includes a plurality of separately spaced, generally rectangular, protrusions which extend across the surface of the back plate 12. The elevated rectangular portions are spaced apart from each other over the surface of the back plate 12. The back plate 12 includes a pair of clamps 22 and 24 which are affixed adjacent to the bottom edge 26 of the back plate 12. These clamps 22 and 24 are adjustable so as to allow the back plate 12 to be affixed to an exterior surface. When the clamps 22 and 24 are affixed to an exterior surface, the back plate 12 will extend in a generally vertical position.

The rocker plate 14 is rotatably connected to the back plate 12. As will be described hereinafter, the rocker plate 14 has a roughened surface on the inner surface adjacent to the roughened surface of the back plate 12. As can be seen, the rocker plate 12 has a generally concave configuration. This concave configuration has a center 28 which is rotatably connected to the back plate 12. The outer edge 30 of the rocker plate 14 has a generally circular configuration. The handle 20 is affixed to the rocker plate 14 and extends upwardly therefrom.

A first skirt portion 32 and a second skirt portion 34 are affixed to the back plate 12 and extend outwardly therefrom. These skirt portions 32 and 34 conform to the circular configuration of the outer edge 30 of the rocker plate 14. As can be seen, the first skirt portion 32 and the second skirt portion 34 have a roughly semi-circular configuration. The skirt portions 32 and 34 define an opening 36 adjacent the top of the rocker plate 14. Similarly, the skirt portions 32 and 34 define a lower opening 38 adjacent the bottom of the rocker plate 14. The handle 20 is affixed to the surface of the rocker plate 14 and extends upwardly through the opening 36 defined by the area between the skirt portions 32 and 34. The handle 20 is a tubular member that is positioned for easy use and access by the user of the nut shelling apparatus 10 of the present invention.

The nut inlet 16 of the present invention includes a feed tray 40 which is affixed to the back plate 12 on a side opposite the rocker plate 14. This feed tray 40 has an interior area 42 suitable for the receipt of nuts. As will be described hereinafter, the feed tray 40 opens to an orifice formed on the back plate 12. The area between the rocker plate 14 and the back plate 12 will define a nut-receiving space for the shelling of nuts.

The nut outlet 18 is affixed to the bottom ends of the skirt portions 32 and 34 and is also affixed to the back plate 12. The nut outlet 18 is made up of a first panel 44 having side walls 46 and 48 extending upwardly therefrom. The upper edge of the side wall 46 is affixed to the end of the second skirt portion 34. The upper edge of the side wall 48 is affixed to the bottom edge of the second skirt portion 32. After the nuts are properly shelled, the fractured shells and the meat will flow across the surface 44 of the nut outlet 18.

Figure 2:
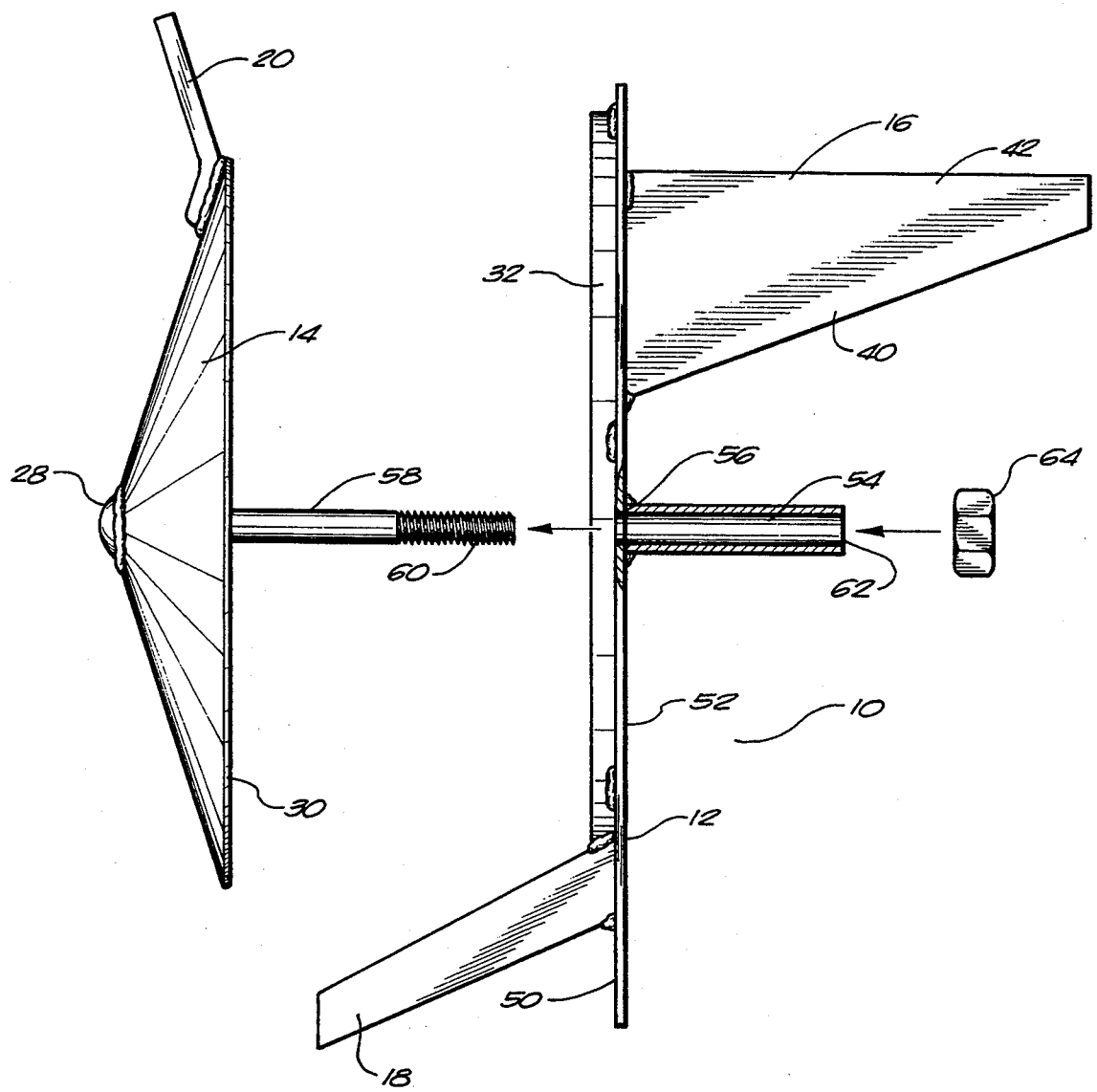
FIG. 2 is an exploded side elevational view of the nut shelling apparatus of the present invention.

FIG. 2 is an exploded view of the configuration of the nut shelling apparatus 10 of the present invention. In FIG. 2, it can be seen that the back plate 12 is a vertical member. The skirt portion 32 is affixed to the roughened surface 50 of the back plate 12 and extends outwardly therefrom. The nut inlet 16 is a chute 40 which is affixed to the back surface 52 of the back plate 12. The nut outlet 18 is affixed to the roughened surface 50 of the back plate 12 and extends outwardly therefrom. The back plate 12 also includes a bushing 54 which is affixed to the back surface 52 and extends transversely to the back plates 12. A hole 56 is formed in the back plate 12 adjacent to the bushing 54 so that the rocker plate 14 can be rotatably connected to the back plate 12.

The rocker plate 14 is a concave member having a center 28 an outer edge 30. A shaft 58 is affixed to the center 28 and extends rearwardly therefrom. The shaft 58 includes a threaded end 60 opposite the center 28 of the concave member 14. The shaft 58 will extend through the hole 56 and through the bushing 54. When the threaded end 60 is inserted through the bushing 54, it will extend outwardly beyond the end 62 of the bushing 54. A nut 64 is fastened to the threaded end 60. The nut 64 can be rotated over the threads of the threaded end 60 so as to allow the distance between the rocker plate 14 and the back plate 12 to be properly adjusted. As can be seen in FIG. 2, the circular outer edge 30 will be closer to the back plate 12 than is the center 28. The handle 20 is affixed to the outer surface of the rocker plate 14 and extends upwardly therefrom.

In normal use, the distance of the rocker plate 14 from the back plate 12 will be adjusted to accommodate various sizes of nuts. In the case of small nuts, it will be desirable to tighten the nut 64 so as to draw the rocker plate 14 closer to the back plate 12 and, thus, to reduce the width of the nut-receiving space. In the case of larger nuts, the nut 64 can be loosened so that the rocker plate 14 is further from the back plate 12. As such, the present invention can be adapted to various sizes of nuts that are to be shelled.

Figure 3:
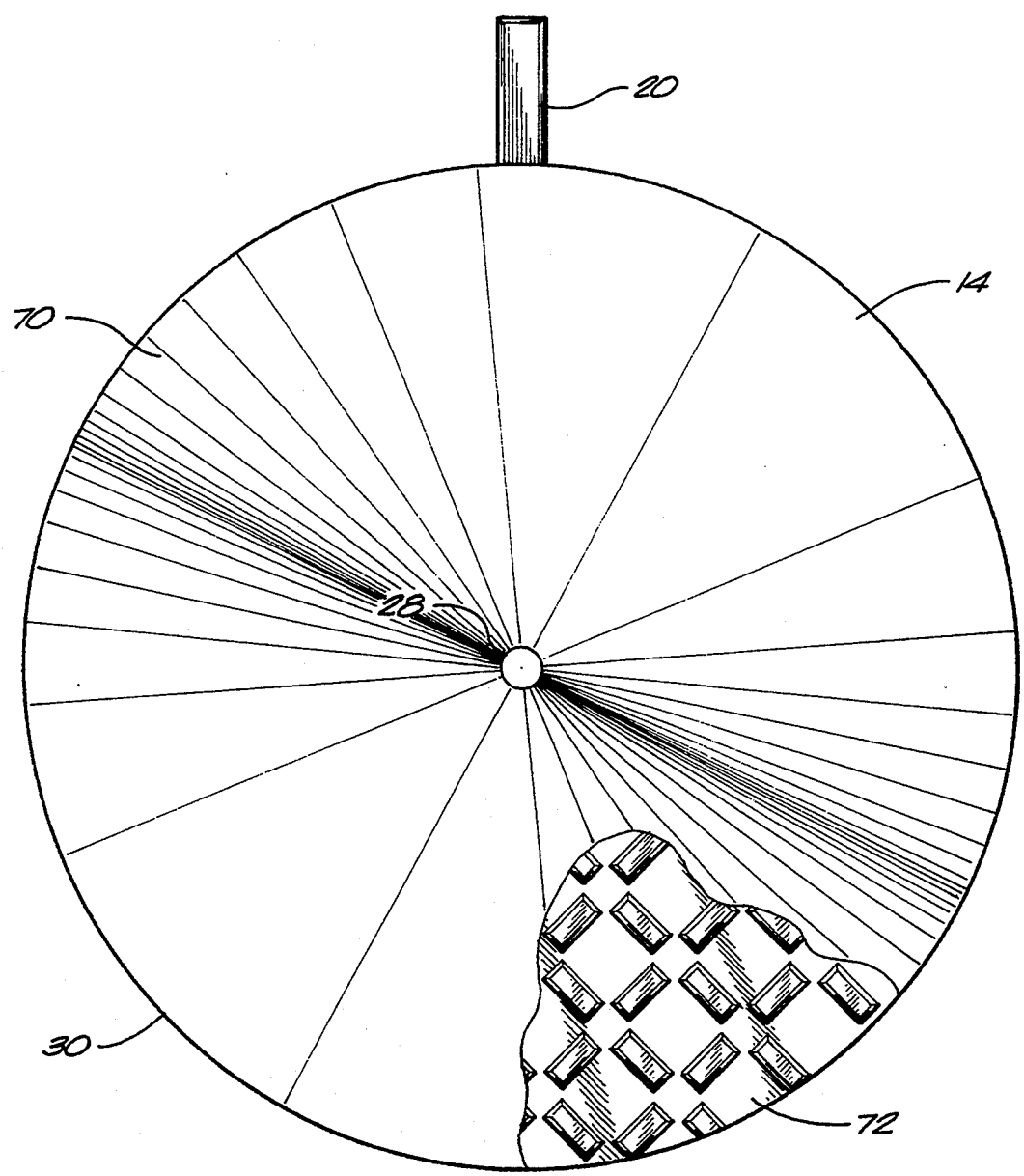
FIG. 3 is an isolated view of the rocker plate of the nut shelling apparatus of the present invention.

FIG. 3 is an isolated front interior view of the rocker plate 14. As can be seen, the rocker plate 14 is a concave member having a center 28 and an outer edge 30. Importantly, the inner surface 70 of the rocker plate 14 is made up of a diamond plate material. A partial illustration of the diamond plate material is illustrated at 72 on the surface 70 of the rocker plate 14. Within the concept of the present invention, the diamond plate 72 can extend over the entire interior surface 70 of the rocker plate 14 or can occupy a portion of the surface 70. The handle 20 extends upwardly above the top of the rocker plate 14.

FIG. 4 is an isolated view of the back plate 12. It can be seen that the nut inlet 16 is a feed tray 40 that has an angled bottom surface 74 extending to the back plate 12. Side walls 76 are positioned on each side of the bottom panel 74 so as to retain the nuts within the feed tray 40. The feed tray 40 will communicate at its end 78 with an orifice formed in the back plate 12. A bushing 54 is affixed to the back plate 12 and extends rearwardly therefrom. The bushing 54 extends transverse to the back plate 12.

The nut outlet 18 is affixed to the forward roughened surface of the back plate 12. As can be seen, the nut outlet includes a panel 44 that extends downwardly, at an angle, from the back plate 12. A side wall 48 is illustrated as extending upwardly from the bottom panel 44. The nut outlet 18 serves to "guide" the shelled nuts to a desired exterior location.

FIG. 5 is a plan view of the back plate 12 and the associated nut inlet 16 and nut outlet 18. As can be seen, the nut inlet 16 includes a bottom surface 74 and side walls 76. The nut outlet includes a bottom panel 44 and side walls 46 and 48. The nut inlet 16 serves to guide the unshelled nuts into the nut-receiving space between the back plate 12 and the rocker plate 14. Similarly, the nut outlet 18 will serve to pass the shelled nuts from the nut-receiving space to an exterior location. The side walls associated with the nut inlet 16 and the nut outlet 18 will retain the materials during the process of shelling the nuts.

Figure 6:
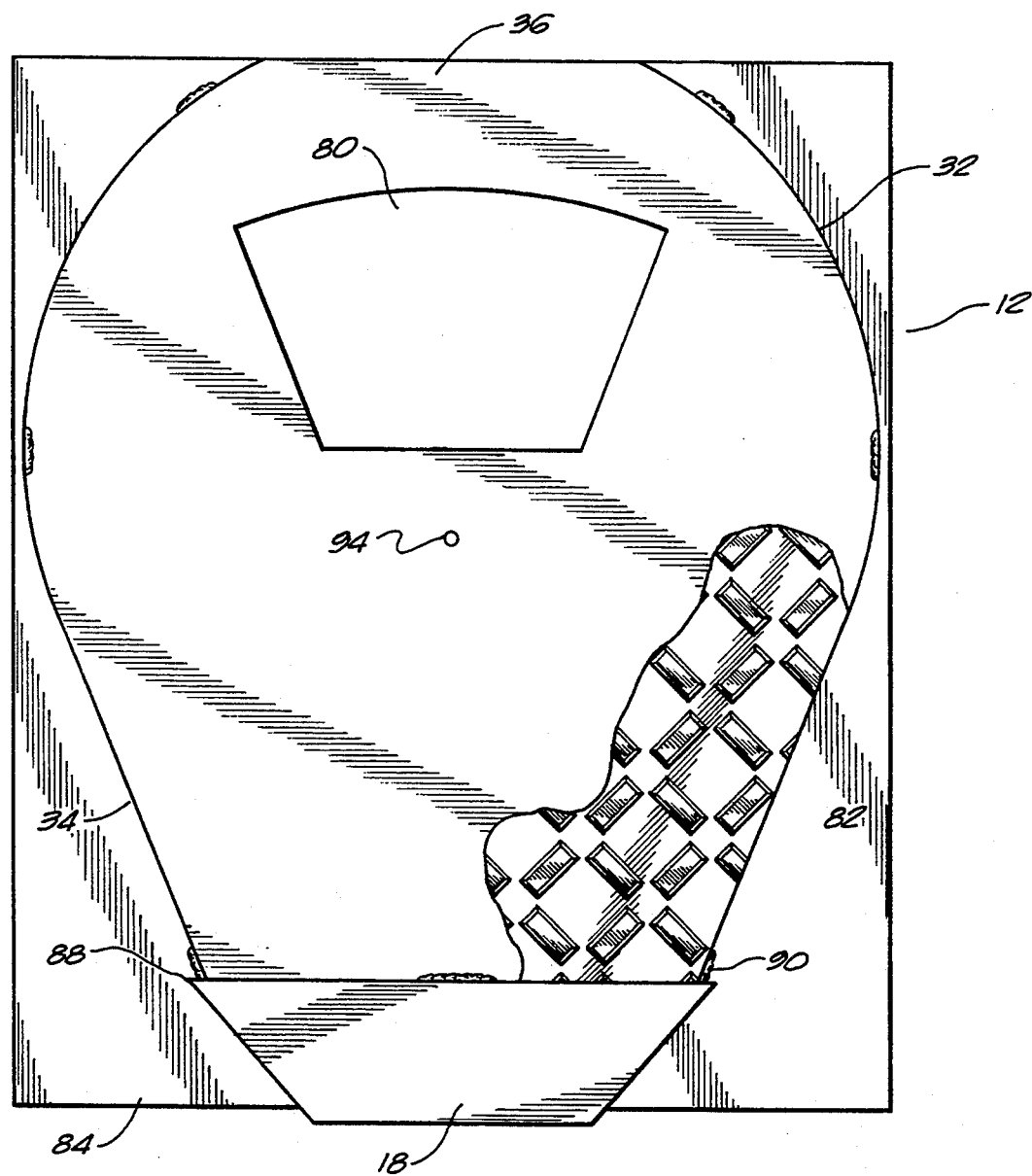
FIG. 6 is an isolated frontal view of the back plate of the nut shelling apparatus of the present invention.

FIG. 6 is an isolated view of the back plate 12. As can be seen, the back plate 12 includes an orifice 80 which is formed therethrough. The nut inlet 16 will be affixed so as to communicate with this orifice 80. The orifice 80 is positioned so as to open to the nut-receiving space between the rocker plate 14 and the back plate 12. It can be seen that the back plate 12 includes a diamond plate material 82. The diamond plate material 82 can extend over the entire surface of the plate 12 or can occupy a portion of the entire space. The partial illustration of FIG. 6 shows that it is possible, within the concept of the present invention, that the spaced-apart protruding rectangular sections can occupy all or a portion of the surface of the back plate 12.

In FIG. 6, it can be seen that the skirt portions 32 and 34 extend outwardly from the roughened surface 84 of the back plate 12. The skirt portions 32 and 34 define an upper opening 36 between their top edges. This upper opening 36 allows the handle 20 to pass outwardly therefrom. Similarly, the bottom edges 88 and 90 of the skirt portions 34 and 32, respectively, allow for the passage of the shelled nuts therethrough and into the nut outlet 18. These bottom edges 88 and 90 are also used so that the nut outlet 18 can be affixed thereto. A central hole 94 is formed in the back plate 12 so as to allow the shaft 58 of the rocker plate 14 to pass into the bushing (on the other side of the plate 12).

The present invention is particularly effective for the shelling of nuts. With reference to FIG. 2, a load of nuts, such as pecans, can be placed into the nut inlet 16. These nuts will flow into the space defined between the interior of the concave member 14 and the exterior surface of the back plate 12. The skirt portions 32 and 34 serve to retain the nuts within this nut-receiving space. When the handle 20 is moved back and forth (as opposed to a full circular rotation), the nuts are forced against the raised rectangular protrusions of the diamond plate material used as the exterior surface of the back plate 12 and the interior surface of the rocker plate 14. The interaction of the nuts with these diamond plate surfaces will cause the shell of the nut to fracture. Conventionally, the motion of the rocker plate 14, in combination with the surface of the back plate 12, will cause the nuts to split in half. When the shells of the nuts are fractured, they will pass through the space between the bottom edge of the rocker plate 14 and the outer surface of the back plate 12. These fractured nuts will then pass into the nut outlet 18. After the fractured nuts pass from the nut outlet 18, the meat of the nut can be easily removed from the fractured shell. As stated previously, the nut 64 can be adjusted on the threaded end 60 so as to allow the present invention to be adapted to various sizes of nuts.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A nut shelling apparatus comprising:
    a back plate having a first roughened surface on one side;
    a rocker plate rotatably connected to said back plate, said rocker plate having a second roughened surface on a side adjacent said first roughened surface of said back plate, said back plate and said rocker plate defining a nut-receiving space therebetween, said rocker plate comprising:
        a concave member having a center and an outer edge, said center connected to said back plate, said outer edge being closer to said back plate than said center;
        a handle affixed to said concave member and extending outwardly beyond said outer edge;
    a first skirt portion affixed to said back plate and extending adjacent a portion of said outer edge of said concave member
    a second skirt portion affixed to said back plate and extending adjacent another portion of said outer edge, said first and second skirt portions defining a first opening adjacent a top of said concave member, said handle extending outwardly through said first opening; and
    a nut inlet connected to said back plate, said nut inlet opening to said nut-receiving space.

2. The apparatus of claim 1, said first skirt portion and said second skirt portion defining a second opening adjacent a bottom of said outer edge of said concave member.

3. The apparatus of claim 2, further comprising:
    a nut outlet chute affixed to said back plate and extending outwardly therefrom, said nut outlet chute positioned adjacent said second opening.

4. The apparatus of claim 3, said nut outlet chute having a panel extending downwardly from said second opening, said nut outlet chute having a first side wall extending upwardly from an edge of said panel and having an edge affixed to said first skirt portion, said nut outlet chute having a second side wall extending upwardly from an opposite edge of said panel, said second side wall having an edge affixed to said second skirt portion.

* * * * *